(12) United States Patent
Guering et al.

(10) Patent No.: US 8,111,461 B2
(45) Date of Patent: Feb. 7, 2012

(54) ARRAY OF LIGHT-DIFFUSING SUB-GRATING

(75) Inventors: Paul-Henri Guering, Paris (FR);
Ludivine Menez, Paris (FR);
Jean-Philippe Mulet, Ozoir-la-Ferriere (FR)

(73) Assignee: Saint-Gobain Glass France, Courbevoie (FR)

( * ) Notice: Subject to any disclaimer, the term of this patent is extended or adjusted under 35 U.S.C. 154(b) by 20 days.

(21) Appl. No.: 12/597,932

(22) PCT Filed: Apr. 16, 2008

(86) PCT No.: PCT/FR2008/050678
§ 371 (c)(1),
(2), (4) Date: Mar. 19, 2010

(87) PCT Pub. No.: WO2008/145896
PCT Pub. Date: Dec. 4, 2008

(65) Prior Publication Data
US 2010/0177394 A1    Jul. 15, 2010

(30) Foreign Application Priority Data
May 4, 2007   (FR) .................................... 07 54878

(51) Int. Cl.
  *G02B 5/18* (2006.01)
(52) U.S. Cl. ........ 359/592; 359/591; 359/596; 359/597; 359/598

(58) Field of Classification Search .................. 359/558, 359/566, 569, 591–598; 350/162, 162.2, 350/162.17
See application file for complete search history.

(56) References Cited

U.S. PATENT DOCUMENTS

| 4,502,756 | A | * | 3/1985 | Peterson et al. | 359/572 |
| 5,009,484 | A | * | 4/1991 | Gerritsen | 359/569 |
| 6,094,306 | A | * | 7/2000 | Jain | 359/568 |
| 6,345,135 | B1 | * | 2/2002 | Reid et al. | 385/37 |
| 2005/0275944 | A1 | * | 12/2005 | Wang et al. | 359/576 |
| 2007/0031140 | A1 | * | 2/2007 | Biernath et al. | 396/268 |
| 2011/0038049 | A1 | * | 2/2011 | Vallius et al. | 359/575 |

FOREIGN PATENT DOCUMENTS

JP   59 099219   6/1984
* cited by examiner

*Primary Examiner* — Clayton E Laballe
*Assistant Examiner* — Kevin Butler
(74) *Attorney, Agent, or Firm* — Oblon, Spivak, McClelland, Maier & Neustadt, L.L.P.

(57) ABSTRACT

The invention relates to a transparent substrate comprising, on its surface, a light-diffusing array comprising at least 10 juxtaposed sub-gratings of parallel lines of features, said features being separated by domains with a refractive index differing from that of the features, each sub-grating comprising at least 20 repeated successive identical features equally spaced apart with a period p, said period varying non-monotonically from one edge of the sub-grating array to the other. This substrate redirects the light without iridescence in a daylighting application.

13 Claims, 2 Drawing Sheets

ARRAY OF LIGHT-DIFFUSING SUB-GRATING

CROSS-REFERENCE TO RELATED APPLICATION

This application is the U.S. counterpart of PCT/FR08/050678, the text of which is incorporated by reference and claims the priority of the French application No. 0754878 filed on May 4, 2007, the text of which is also incorporated by reference.

The invention relates to the field of architectural glazing comprising features capable of redirecting light, coming from outside, in a desired direction to the inside, generally the ceiling. This type of glazing is generally qualified as "daylighting" when it is visible sunlight that is to be deflected.

This type of glazing is generally considered as contributing to energy savings on account of the fact that external light is used more efficiently inside, which makes it possible to reduce artificial lighting.

U.S. Pat. No. 5,009,484 teaches an item of glazing comprising a diffraction grating consisting of parallel lines in relief. This document teaches that the grating usually leads to light diffraction resulting in color separation. This effect is not necessarily desired. In order to limit the extent of this phenomenon, the same document recommends (see its FIG. 3) juxtaposing three basic colors vertically, so that the emerging beams of the three colors should blend once again on the ceiling to reform a colorless illuminated zone. The three successive gratings have different periodicities, varying monotonically and according to a precise order. This document also teaches that the three successive gratings may be replaced by a single grating of which periodicity changes monotonically from one of the ends of this single grating to the other. The solutions taught by this patent work to some extent but do not prevent any iridescence forming. Moreover, in this document, the fusing features are slanted, possibly variable, and have a variable depth, which makes industrial manufacture very difficult over a large area and with low costs.

The present invention relates to a surface grating limiting the apparent separation of the various colors of light and leading to illumination with substantially the same coloration as the incident light, without pronounced apparent iridescence of the deflected light (generally on the ceiling). Thus, if the incident light is substantially colorless to the naked eye, so is the emergent light. It is desirable that the deflected light be also colorless according to a single order of the grating (general order 1 of the grating) since otherwise this would produce various separate illuminating zones (on the ceiling if the light is projected to the ceiling) some of which would not be judiciously placed, which, moreover, could be unattractive.

Figure 1:
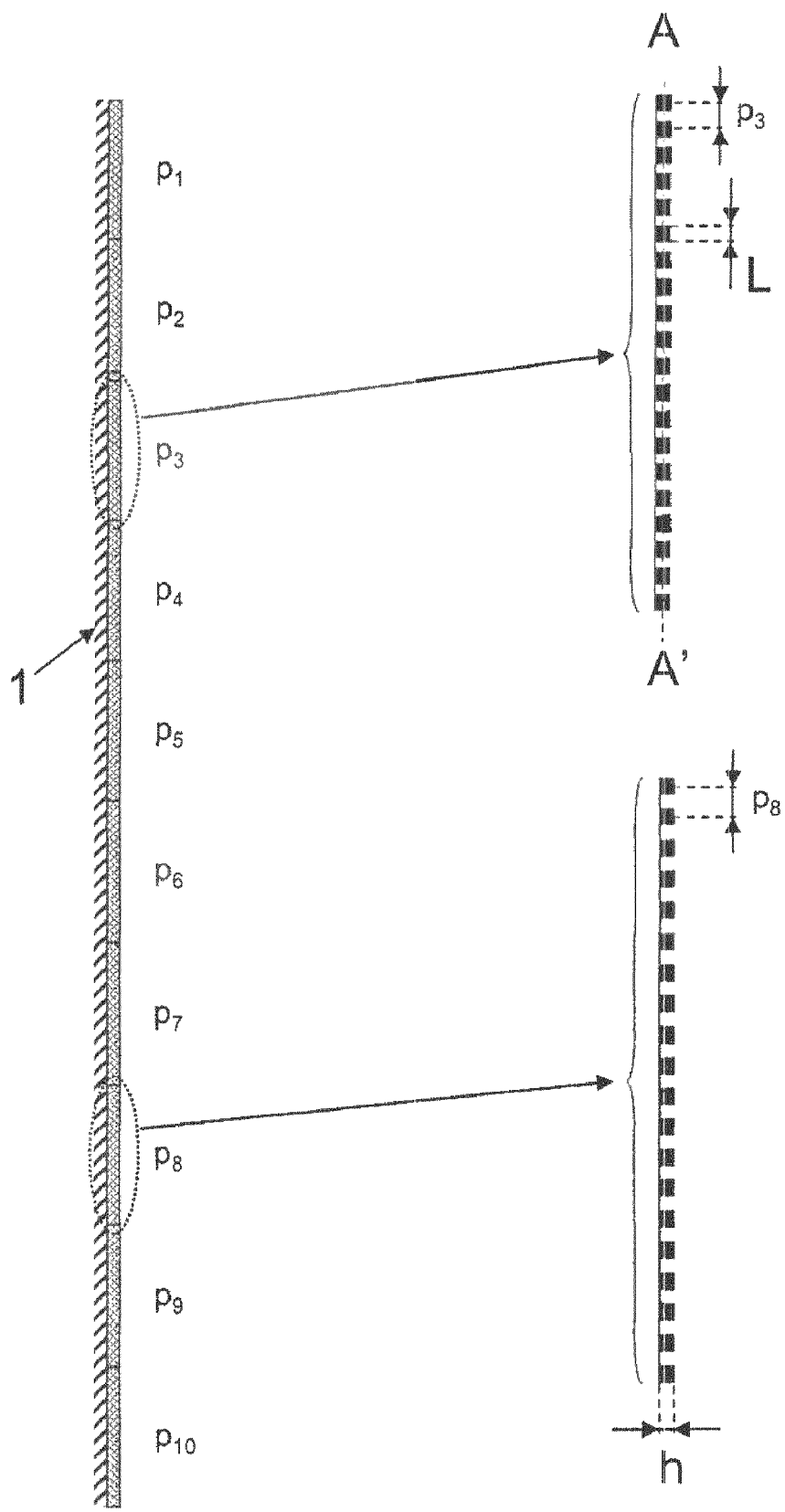
FIG. 1 shows in cross section a transparent substrate provided on its surface with an array of ten sub-gratings according to the invention.

The substrate according to the invention is transparent, which means that it is then possible to see clearly through it whatever the viewing angle of the observer.

According to the invention, there is created, on the surface of a transparent substrate and in a direction parallel to said surface, a grating that is a light-diffusing array comprising at least 10 juxtaposed sub-gratings consisting of parallel lines of features, said features being separated by domains having a refractive index that differs from that of the features, each sub-grating comprising at least 20 repeated successive identical features equally spaced with a period p, said period varying non-monotonically from one edge of the set of sub-gratings to the other.

Within the context of the present invention, the notion of diffusion applies to the deflected light and relates to the entire grating (including all the sub-gratings).

According to the invention, there is created, on the surface of a transparent substrate grating comprising an alternation of at least two refractive indices R1 and R2 by linear elementary features of index R1 separated by linear elementary domains of index R2, said features and domains being geometrically complementary to each other. The features and domains are complementary geometrically since they fit into each other. This is why only the definition of the geometry of the features of index R1 is sufficient, since the domains with index R2 fill all the space situated between the features. The geometry of the features is defined in particular, by their width L parallel to the substrate, by the period with which they are repeated within a sub-grating and by their depth h. The use of the term "period" clearly indicates that, within each sub-grating, the features are identical and the distance between neighboring features is constant and equal to this period.

According to the invention, the grating contains, so as to be juxtaposed, a multiplicity of sub-gratings having different periods, these sub-gratings being placed in the grating in a dispersed manner (from the standpoint of their individual periods) so as to jumble up the various emergent rays and result in a neutral illumination without any particular coloration.

According to the invention, the period p of neighboring sub-gratings varies non-monotonically from one edge of the grating to the other (i.e. the set of sub-gratings). The term "non-monotonically" means that this period does not merely increase or decrease upon going from one edge of the grating to the other. On the contrary, this period p alternates from higher values to lower values upon passing from one edge of the grating to the other.

The period p varies from one edge of the grating to the other, about a mean period $P_m$ defined as the ratio of the sum of the distances between barycentres of adjacent features to the total number of features of the entire grating, i.e. the set of all the juxtaposed sub-gratings. In particular, the period p is preferably at least n times greater than $P_m$ and at least n times smaller than $P_m$, two sub-gratings of period greater than $P_m$ being separated by at least one sub-grating of period less than $P_m$, two sub-gratings of period less than $P_m$ being separated by at least one sub-grating of period greater than $P_m$, n being an integer equal to or greater than 2, especially equal to or greater than 3, or even equal to or greater than 4 and even equal to or greater than 5. This means that p departs from $P_m$ at least 2n times, especially with a minimum difference y, so as to exceed the value $P_m+y$ n times and drop below the value $P_m-y$ n times, the value y depending on the wavelength that it is desired to deflect, but generally being at least 5% $P_m$ and more generally at least 10% $P_m$.

The variation in p from one edge of the grating to the other may be even further accentuated. The fluctuation in p upon going from one edge of the grating to the other may also be determined and may follow, for example, a sinusoidal curve about the value $P_m$. However, preferably this fluctuation is independent. It may even be random. In the latter case, the curve representing the distribution of p around $P_m$ is of the Gaussian curve type.

The period p varies around $P_m$, generally remaining within a range between $P_m+x$ and $P_m-x$, the value x depending on the wavelength that it is desired to deflect. Generally, x is at most 50% $P_m$ and more generally at most 20% $P_m$.

Each sub-grating comprises at least 20 identical successive features repeating with a period p, i.e. the distance between two successive features. Each sub-grating comprises in total more generally at least 100 identical successive features and even at least 500 identical successive features.

Each sub-grating generally has a height of between 0.1 mm and 12 mm and more generally between 3 and 10 mm. This height corresponds to the characteristic period of the sub-grating in question multiplied by the number of features contained in said sub-grating.

The grating according to the invention generally contains from 40 to 10 000 and more generally 100 to 5000 juxtaposed sub-gratings and the lines of features of which are parallel.

The mean period $P_m$ has a value of the order of the wavelength of the radiation that it is desired to deflect. The same applies in respect of the period p of each sub-grating.

Let us recall that radiation has substantially the following wavelengths:
ultraviolet: 150 to 400 nm
visible: 400 to 800 nm
infrared: 800 nm to 100 µm.

Whatever the sub-grating, its period p is chosen between ½ and twice the wavelength that it is desired to deflect. The value p therefore always lies between 75 nm and 200 µm. In general, whatever the sub-grating, p lies between 100 nm and 20 µm.

If it is visible light that it is desired to deflect, the periods p of the sub-gratings (and therefore $P_m$) is preferably chosen within the range 200 to 600 nm, preferably within the range 300 to 500 nm.

Although it is not excluded that they are slanted, the features are generally non-slanted (a person skilled in the art would say "blazed"), that is to say symmetrical in relation to the straight line perpendicular to the substrate and passing through the barycenter of the feature.

In general, the width L of the features ranges from 0.1 $P_m$ to 0.9 $P_m$ and preferably from 0.4 $P_m$ to 0.6 $P_m$.

Generally, the ratio of the width L to the depth of the features ranges from 0.2 to 5 and preferably from 0.4 to 2.

If a line is followed parallel to the substrate passing through the centers of gravity of the features, one passes successively through the refractive index R1 of the features and the refractive index R2 of the domains between features. In particular, the features may be of glass and the domains may be of air. In this case, protuberances in glass are produced as features on the surface of a glass substrate. Air fills the space between the features and naturally constitutes the domains. In this case, the index R1 is that of glass, for example 1.5, and the index R2 is that of air, that is to say 1. In this example, features are produced in relief at the surface of a substrate. The transition from a feature to a domain may however correspond to a change in refractive index that does not correspond to a portion in relief. In point of fact, it may consist of two different materials imbricated one in the other in such a way that the surface is smooth to touch. It is possible in particular to produce such an alternation of materials by ion exchange techniques or techniques based on a photorefractive and electrooptic effect.

The refractive indices of features and domains may extend from 1 to 2.2. Generally, the features may have their refractive index ranging from 1.1 to 1.8. Generally, the domains may have their refractive index ranging from 1 to 1.5.

The difference between the two refractive indices (those of the features and the domains) may generally be between 0.02 and 1.5.

Generally, if the domains are air, the features have a refractive index greater than that of the domains.

Since the glazing is essentially for equipping buildings, the materials constituting said glazing (substrate, and possibly a part added to said substrate) will be chosen with satisfactory transparency.

The grating according to the invention serves in particular in a daylighting application. In this case, it is generally placed on a vertical item of glazing so that the lines of features are horizontal. It is not excluded for the lines of features to be slanted. The grating generally occupies a height of at least 10 cm and more generally a height of at least 20 cm of the glazing, generally over the entire width of the glazing. Each sub-grating therefore has in general the width of the entire glazing. Generally, the sub-gratings all have the same height, but it is not excluded for them to have different heights.

The features may be located on that face of the glazing which receives the incident light or on that face of the glazing from which light emerges (the face turned toward the interior of the building).

The grating according to the invention may generally be produced by the following techniques: embossing, photolithography, transfer, ion exchange, photorefractive or electrooptic effect.

A first method comprises embossing a sol-gel layer or polymer added to a transparent sheet (substrate), in particular one made of glass. Embossing is a plastic or viscoplastic deformation produced by contact with a structured element, consisting of a roller for example and on which a pressure is simultaneously applied. The sol-gel layers that can be used are generally liquid layers of a mineral oxide precursor such as $SiO_2$, $Al_2O_3$, $TiO_2$ etc, for example dissolved in a water-alcohol mixture. These layers harden on drying, with or without auxiliary heating means. As $SiO_2$ precursor, mention may be made of tetraethoxysilane (TEOS) or methyltriethoxsilane (MTEOS). Organic functional groups may be included in these precursors and the silica finally obtained. As an example, fluorosilanes have been described in EP 799 873 for obtaining a hydrophobic coating. The embossing may be carried out on polymer layers such as:
polyethylene terephthalate (PET);
polystyrene;
polyacrylates such as polymethyl methacrylate, polybutyl acrylate, polymethacrylic acid, poly(2-hydroxyethyl methacrylate) and copolymers thereof;
polyepoxy(meth)acrylates;
polyurethane(meth)acrylates;
polyimides such as polymethylglutarimide;
polysiloxanes such as polyepoxysiloxanes;
polyvinyl ethers;
polybisbenzocyclobutenes, etc,
alone or as copolymers or blends of several of these.

Embossing may be followed in some cases by etching. The embossed sol-gel or polymer layer may be etched until the material of the subjacent transparent sheet reappears, first of all in the deep parts of said features in relief, and then progressively as far as their upper part. Thus the more or less irregular surface obtained at the end of etching may be formed entirely in the added sol-gel or polymer layer, or partly in this and partly in said transparent sheet, or else entirely within the latter. The etching conditions should be regulated so that this resulting surface has features in relief with dimensions satisfying the definition of the device of the invention.

As etching methods, mention may be made of:
chemical etching, in particular by an acid;
reactive ion etching (RIE) or reactive ion beam etching (RIBE); plasma or inductively coupled plasma (ICP) etching.

It should be noted that the embossing method permits rapid treatment to be carried out over relatively large areas, at a moderate cost.

Another possible method for producing the grating according to the invention comprises photolithography. This method generally consists first of all in providing the transparent substrate with a first layer in which said relief features may be formed. This first layer is comparable to the added sol-gel or polymer layer of the embossing method. It may in addition be of the same nature as this, in particular in silica. In a second step of the method, a second layer consisting of a photoresist is deposited. This is cured in defined localities, by exposure to targeted radiation. A mask is thus made, above the first layer to be etched, after removal of uncured parts of the photoresist. Etching then takes place in a similar manner to that described above in relation to the optional step of the embossing method. Any residues of the photosensitive resin may be removed.

Another method for producing the grating according to the invention comprises the transfer of a nanostructured layer. A layer adhered to a first support is adhered onto a second, so as to constitute a device according to the invention. The layer may be made of plastic or the like.

Another method that may be used is based on ion exchange, for example of $Na^+$ ions by $Ag^+$ ions in a mineral glass.

Finally, a photorefractive effect may be used, in which modulated light induces a spatial modulation of the refractive index of the material (example: photorefractive crystal of barium titanate). Use may also be made of an electrooptic effect according to which an electric field induces a spatial modification of the refractive index of the material.

FIG. 1 shows a transparent substrate in section provided with a diffusing grating according to the invention. This grating is located in the upper part of a glazing unit for a building. The substrate 1 comprises at its surface a multiplicity of horizontal parallel lines of features p with a square section. The features are thus linear and parallel in a direction perpendicular to FIG. 1. These features are therefore parallelepipeds of length corresponding approximately to the width of the glazing, of width L and depth h. The grating consists of 10 juxtaposed successive sub-gratings each having its own period denoted by $p_1$ to $p_{10}$. Two of the sub-gratings have been enlarged, those having a period p3 and p8 respectively, thereby making it possible to see the features by their section. The section of the features is square (L=h) and the distance between two identical points of neighboring features (for example their barycenters) is $p_3$ and $p_8$ respectively. The barycenter of a feature in FIG. 1 is at the point of intersection of the diagonals of the square representing the section of said feature. The two enlarged sub-gratings each contain 20 features. It may be seen in each sub-grating that the features are identical and separated by a given value defining a period, the period varying from one sub-grating to another, in particular $p_8$ is greater than $p_3$. The features have a refractive index R1. They are separated by air, which therefore constitutes the domains between features. These air domains have a refractive index R2 which is generally about 1. The dotted virtual line AA' passes through the barycenters of the features of the sub-grating of period $p_3$.

Figure 2:
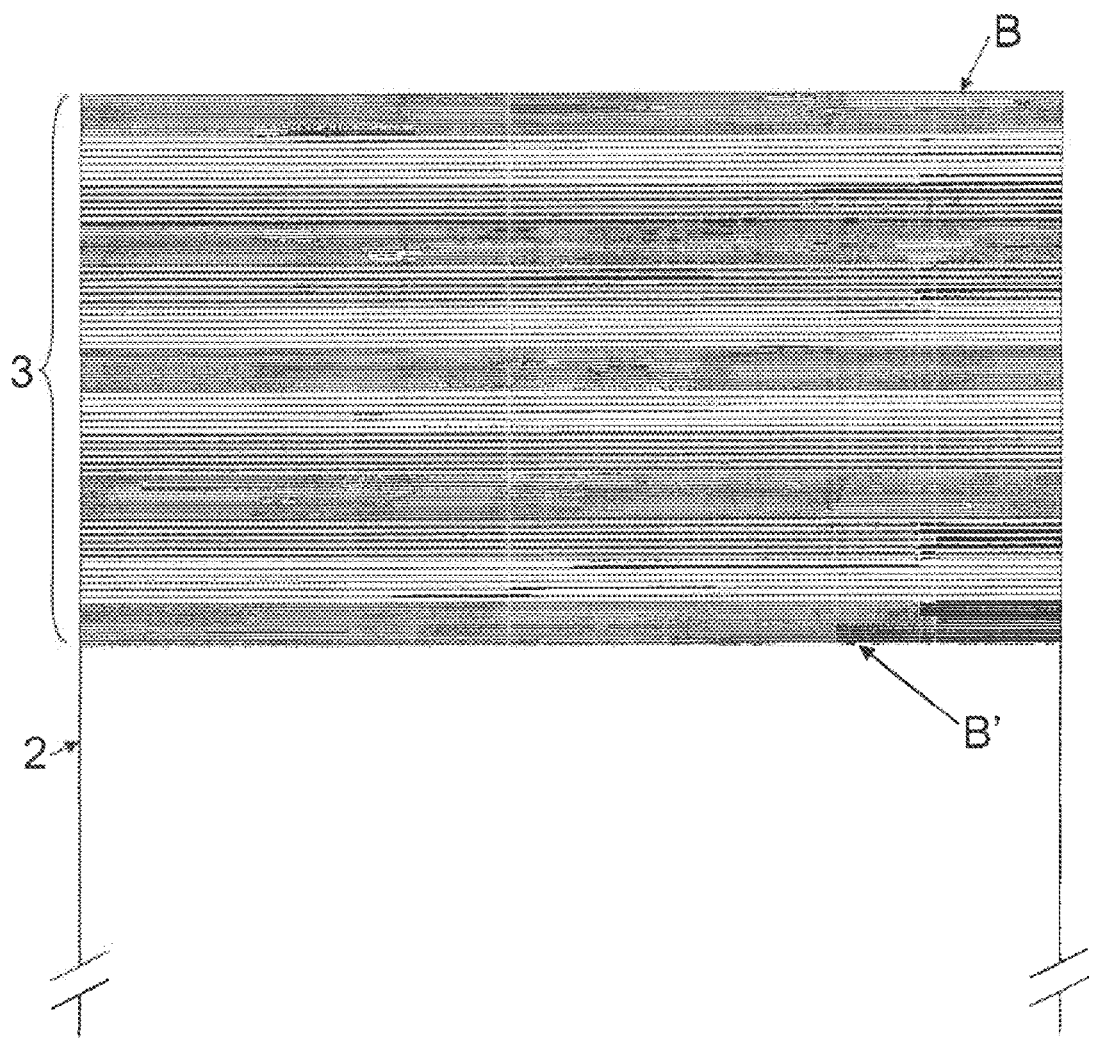
FIG. 2 shows a glazing unit provided in its upper part with an array of thirteen sub-gratings according to the invention.

FIG. 2 shows a glazing unit 2 made of mineral glass which can be fitted vertically in a building window. The upper part of the glazing unit is provided with an array of thirteen sub-gratings 3 according to the invention. The features of the sub-gratings are shown by horizontal lines. The sub-gratings all have the entire width of the glazing and all have the same height. It may be seen that the sub-gratings are juxtaposed one beneath another in a dispersed order as regards their period when going from an edge B of the sub-grating array to the other edge B' of the sub-grating array. Of course, this is a purely qualitative representation so as to show the positioning of the sub-gratings relative to one another on the glazing. The sizes of the sub-gratings and of the lines of features do not correspond to reality.

EXAMPLE 1 (COMPARATIVE)

A 360 nm thick layer of silica was deposited by sol-gel over 50 cm situated in the upper part of an item of glazing of tradename "Planilux" marketed by Saint-Gobain Glass France. In a manner known to a person skilled in the art, a texture of linear features in relief with a depth of 360 nm and width 200 nm was produced. The features were perpendicular to the plane of the film. The separation between the centers of gravity of these features passed progressively from 300 to 500 nm when passing from one edge of the grating to the other (i.e. traveling over the 50 cm of grating). The glazing was then placed as an external wall window. The glazing redirected the light coming from the outside toward the ceiling, but iridescence was perceived.

EXAMPLE 2

The procedure was as in example 1, except that the texture consists of 50 sub-gratings of 400 nm mean periodicity. The period varied from one sub-grating to another randomly between 300 and 500 nm. No marked iridescence was observed.

The invention claimed is:

1. A transparent substrate comprising, on a surface thereof, a light-diffusing array comprising at least 10 juxtaposed sub-gratings of parallel lines of features, said features separated by domains of refractive index different from that of the features, each sub-grating comprising at least 20 repeated successive identical features of equal separation with a period p, said period varying non-monotonically from one edge of the sub-grating array to the other.

2. The substrate claimed in, claim 1 wherein, if $P_m$ is the mean period for the array of sub-gratings, the period p is at least n times greater than $P_m$ and at least n times smaller than $P_m$, two sub-gratings of period greater than $P_m$ are separated by at least one sub-grating of period smaller than $P_m$, two sub-gratings of period smaller than $P_m$ are separated by at least one sub-grating of period greater than $P_m$, and n is an integer equal to or greater than 2.

3. The substrate claimed in claim 2, wherein p differs from $P_m$ at least 2n times by a minimal amount y, so as to exceed n times the value $P_m+y$ and fall n times below the value $Pm-y$, where value y is at least 5% $P_m$.

4. The substrate claimed in claim 3, wherein y is at least 10% $P_m$.

5. The substrate claimed in claim 2, wherein n is greater than or equal to 3.

6. The substrate claimed in claim 2, wherein p varies around $P_m$ by amount x while remaining between $P_m+x$ and $P_m-x$, x is at most 50% $P_m$.

7. The substrate claimed in claim 6, wherein x is at most 20% $P_m$.

8. The substrate claimed in claim 1 wherein each sub-grating comprises at least 20 features.

9. The substrate claimed in claim 1, wherein the array comprises 40 to 10,000 sub-gratings.

10. The substrate claimed in claim 1, wherein, for any sub-grating of the array, p is between 75 nm and 200 μm.

11. The substrate claimed in claim 1, wherein, for any sub-grating of the array, p is between 100 nm and 20 μm.

12. A window comprising the substrate claimed in claim 1.

13. A process of redirecting sunlight to a ceiling comprising diffusing sunlight from the substrate claimed in claim 1.

* * * * *